J. D. Wilber,
Mower.

No. 101,554. Patented Apr. 15, 1870.

2 Sheets—Sheet 1.

Witnesses:

Inventor:
J. D. Wilber

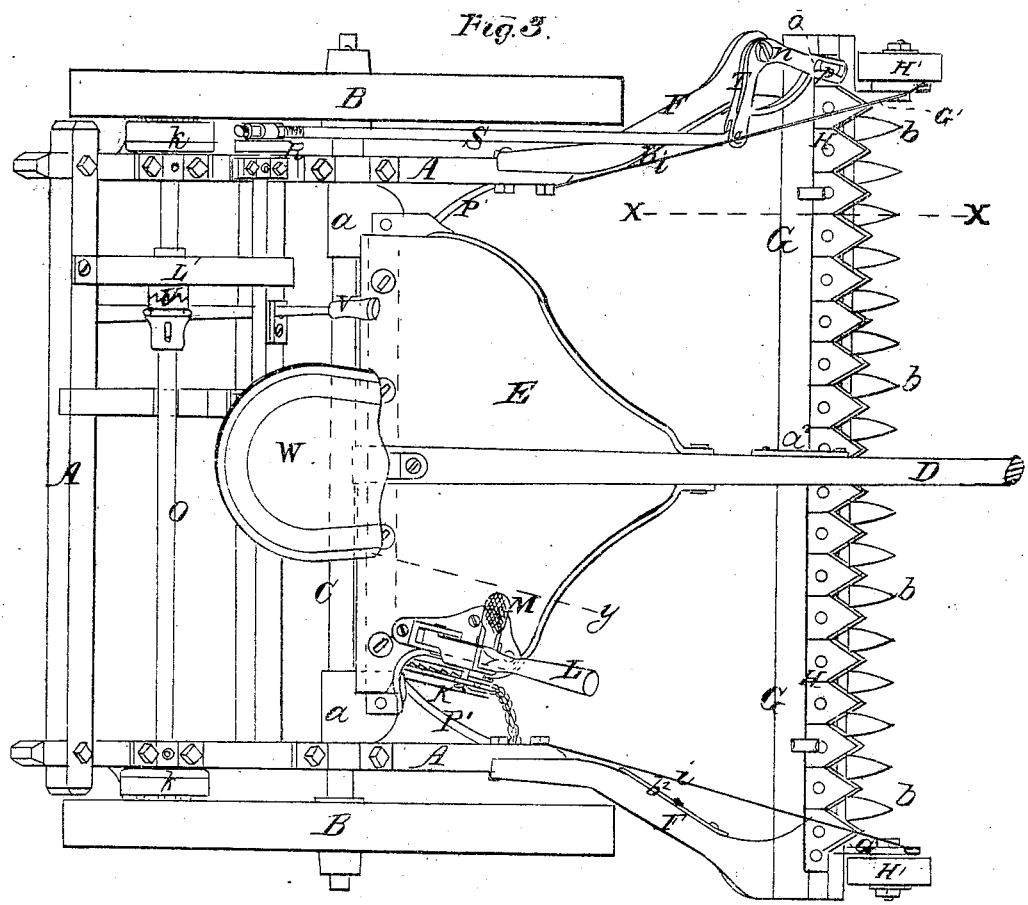
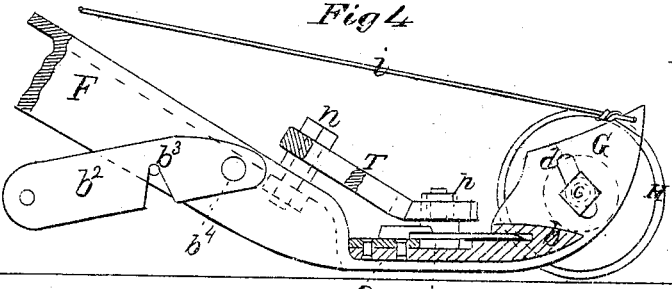
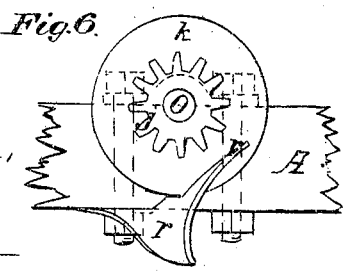
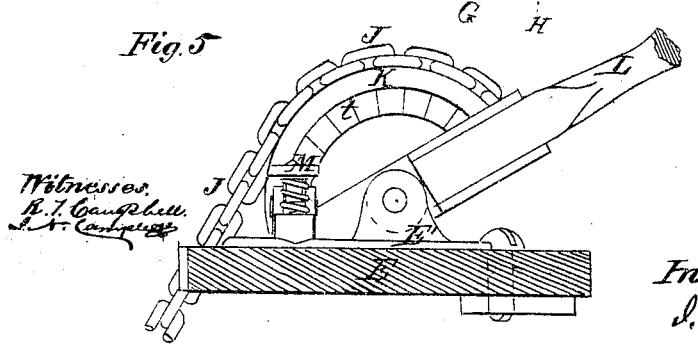
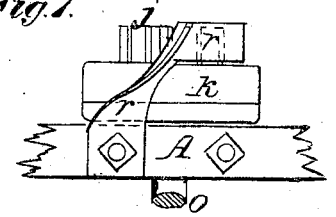

UNITED STATES PATENT OFFICE.

JOHN D. WILBER, OF POUGHKEEPSIE, NEW YORK.

IMPROVEMENT IN MOWING-MACHINES.

Specification forming part of Letters Patent No. 101,554, dated April 5, 1870.

*To all whom it may concern:*

Be it known that I, JOHN D. WILBER, of Poughkeepsie, in the county of Dutchess and State of New York, have invented certain novel Improvements on Mowing-Machines; and I do hereby declare that the following is a full, clear, and exact description thereof, reference being had to the accompanying drawings, making a part of this specification, in which—

Figure 1:
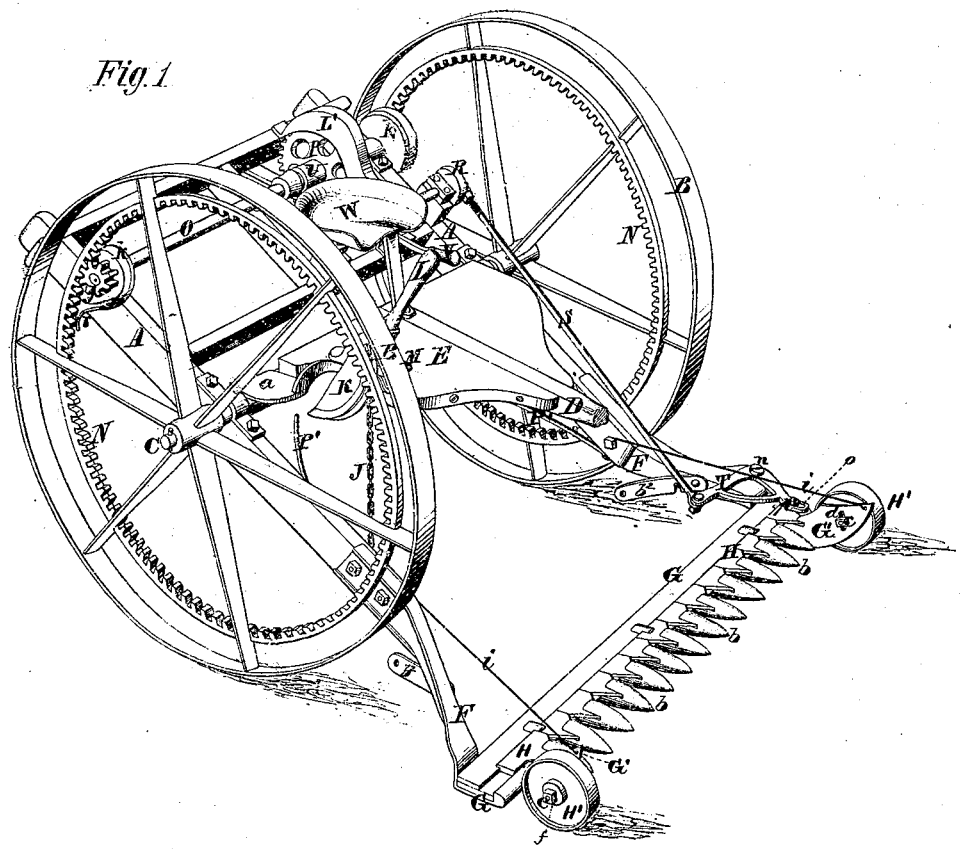
Figure 2:
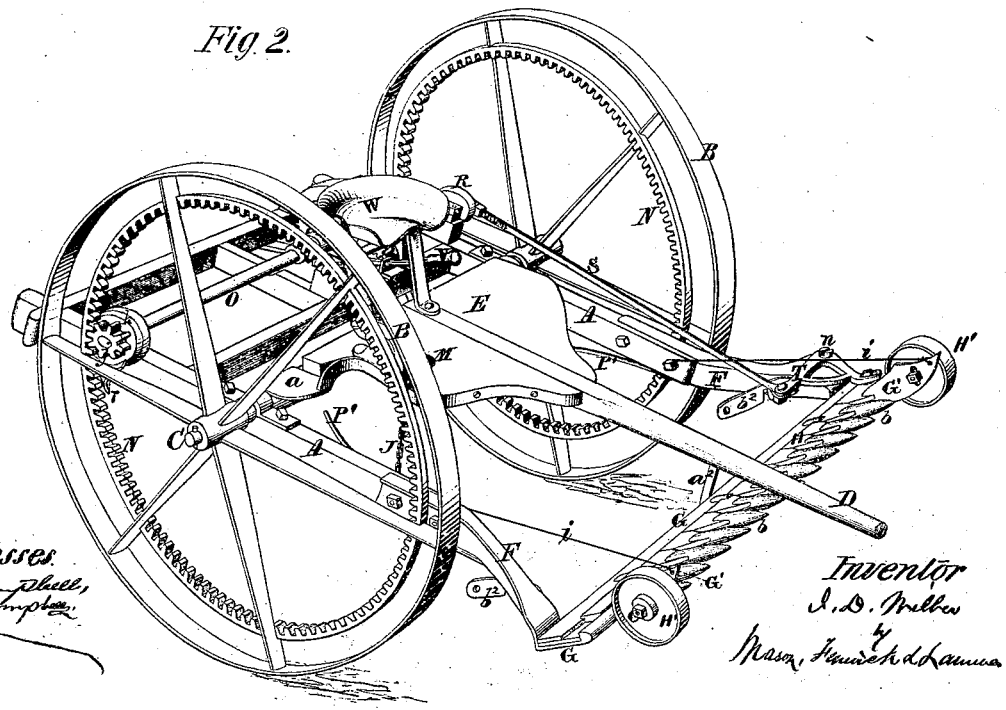

Figure 1, Sheet 1, is a perspective view of the improved mower arranged for operation. Fig. 2, Sheet 1, is a similar view of the same parts, showing the cutting apparatus raised out of working position, and suspended from the draft-pole. Fig. 3, Sheet 2, is a plan view of the machine with cutting apparatus depressed. Fig. 4, Sheet 2, is an enlarged sectional view taken in the vertical plane indicated by line $x\,x$ in Fig. 3. Fig. 5, Sheet 2, is an enlarged view, showing the construction of the raising and lowering device. Figs. 6 and 7, Sheet 2, are enlarged views of one of the driving-pinions, and the grass-guard applied to the same.

Similar letters of reference indicate corresponding parts in the several figures.

This invention is confined to that class of mowing machinery wherein the sickle and finger-bar are arranged in front of the transporting and driving wheels, and the draft-pole is applied to the axle of said wheels in such manner as to obtain a direct central draft. The improvements which I have made will overcome objections and difficulties incident to the present modes of mowing by horse-power with this class of mowing machinery.

To enable others skilled in the art to understand my invention, I will describe its construction and operation.

In the accompanying drawings, A represents the frame of the machine, which is sustained by the axle C of two transporting and driving wheels, B B. This frame A is attached to the axle C, as shown in the drawings, by means of loose bearings, which allow the frame to rock vertically upon the axle, and to assume an inclined position. (Shown in Figs. 1 and 3.)

The wheels B B are both applied to their axle so as to turn loosely thereon, and, by means of the inside spur-wheels N N, which are applied to the spokes of wheels B so as to engage with pinions $j\,j$, both transporting-wheels serve as driving-wheels for giving motion to the sickle, as will be hereinafter explained.

The draft-pole D has a platform, E, upon its rear end, which pole and platform are applied to the axle C by clips $a\,a$, so that the line of draft shall intersect the middle of the length of said axle, by which means all side strain upon the horses is prevented.

This draft-pole D projects from the axle C over the cutting apparatus, and the doubletree, to which the horses are attached, may be applied to this pole in the manner described in the schedule annexed to my Letters Patent numbered 37,656, and dated February 10, 1863.

To the front end of each side bar of frame A there is firmly secured a bar, F, which curves outwardly, so that the front end thereof will extend out beyond the vertical plane of the wheel B in rear of it.

These bars may be made of metal, so as to possess the required strength and form to serve the purposes for which they are designed.

Fig. 3 shows clearly the relation which the front ends of these arms bear to the tracks of the wheels B B.

To the front ends of these arms F F the finger-bar G is rigidly attached, the sickle H being fitted on said bar, and its teeth arranged so as to work through the fingers or guards $b$, in the usual well-known manner.

The outward curvature of the bars F F admits of the finger-bar and sickle being made of sufficient length to cut a swath of greater width than the tracks of the wheels B, thereby preventing them from rolling upon and pressing down uncut grass.

At or near each end of the finger-bar G, a shoe, G', is secured, having wheels H' H' applied to them, the axes $c$ of which are fitted in oblong slots $d$ made through said shoes, and secured to the shoes by nuts $f$, as shown.

By loosening the nuts $f$, the sickle and finger-bar can be raised or depressed, and set to cut higher or lower, as may be required.

The wheels H' H' are applied outside of their respective shoes, and these shoes are applied to the finger-bar, so that one or the other wheels H' will roll upon the uncut grass, whichever one of them is run next the uncut grass in mowing.

Both shoes are alike in form and size, and both wheels H' are alike in size and arrangement, thereby allowing either side of the machine to be run next to uncut grass, and admitting of the passage forward and back of the machine while cutting in a field.

The shoes G' are curved in front, and each one is extended up to a point high enough to run above the uncut grass, and serve as a divider; and from the highest point of each shoe to the front end of each side bar of frame A, a rod, $i$, is stretched, the object of which is to direct and press the grass, as it is cut, toward the center of the machine, so as to lay it over out of the way of the arms F, and prevent it from being scattered.

The slots $d$, through the shoes G, will allow the wheels H' to be adjusted out of the way of sickle H when it is desired to remove the sickle from the finger-bar for sharpening or other purposes; for it will be seen, by reference to Fig. 4, that, without such provision for adjustment, the sickle could not be readily withdrawn from the guard-fingers.

The sickle and finger-bar are elevated, in order to pass freely over obstructions, by having a chain, J, attached to the front part of one of the side pieces of the main frame, and also to a semi-pulley, K, secured to the lower part of a hand-lever, L, the fulcrum of which is on platform E.

The half pulley has a concentric rack, $l$, on its inner side, with which a pawl, M, on the platform E, engages.

The pawl holds the half pulley K and lever L, and thus keeps up the sickle and finger-bar.

This pawl may, at any time, be disconnected from the rack $l$ by pressing the inner end of it down with the foot, and the finger-bar consequently lowered.

To hold up the finger-bar and sickle out of the way when the machine is not mowing, I employ a pivoted hook, $a^2$, upon the draft-pole D, so arranged that, when the finger-bar is brought up closely beneath said pole, it can be held in this position, without strain upon the chain J, by the hook $a^2$ catching under it, as shown in Fig. 2.

The sickle H is driven from the wheels B B by means of the concentric toothed gear N N, attached to said wheels, and engaging with the pinions $jj$ at the side of ratchets $k\,k$, which engage with a shaft, O, on the rear part of the frame A when the machine is drawn forward, but do not engage when the machine is "backed." By this arrangement the sickle is rendered inoperative during a retrograde movement of the machine.

On the shaft O there is placed loosely a toothed wheel, P, which gears with a pinion, Q, on a shaft having a crank-wheel, R, at its outer end.

To the wrist-pin of the crank-wheel R one end of a rod, S, is connected, the opposite end being attached to an angular lever, T, the fulcrum-pin $n$ of which rises from one of the bars F. The front end of this bent lever T has an oblong slot, $o$, through it, to receive a flat-faced slider, $p$, that is pivoted on the sickle-bar. By this simple arrangement a reciprocating motion is communicated to the sickle, and with but little friction, the jars and concussions which usually attend the operation of these sickles being avoided. The wheel P on the shaft O is connected with the shaft by means of a clutch, U, which is moved by a lever, V, the latter extending forward within convenient reach of the driver in his seat W. The sickle may be rendered inoperative at any time by disconnecting wheel P from the shaft O.

In the drawings, the wheel P and pinion Q are housed in by a covering, L', which is secured to the frame A.

In the practical operation of the machine, it is found necessary to prevent the inside gear-wheels N, on the driving and transporting wheels B, from carrying up loose grass to the pinion-wheels $jj$. This I prevent by the use of curved guards $r\,r$, which are shown clearly in Figs. 6 and 7. They are secured to the bottom edges of the side bars of frame A, beneath the journal-bearings of the shaft O, and curved, so as to extend out in front of the teeth of inside gear N, and beneath the wheels $jj$ and ratchet-boxes $k\,k$, as shown.

These guards or fenders $r\,r$ will prevent grass from becoming entangled with wheels $jj$ and ratchet-boxes $k$.

As a further means of preventing the cut grass from being pressed upon the wheels B, I employ track-clearers $b^2\,b^2$, arranged immediately in front of wheels B B, and pivoted to the bars F, so that, when their rear ends are depressed, as shown in Fig. 1, they will scrape away the grass in front of the said wheels, and thus prevent the grass from being pressed down, and caused to dry unequally; and, to effect the pressing of the tops of the grass together so as to leave it in a standing (or as nearly so as possible) posture, a guide-rod, P', is extended from the forward end of each of the side beams or timbers A A of the main frame.

These rods P' P' start from the point where the flaring front part F F of the frame adjoins the said side beams, and carried back and downward in an inclined position underneath the axle of the transporting-wheels, and also converging, by reason of their oblique set, with respect to the beams A A, as well as the curved form which is given to them before they are applied to the beams.

The driver's seat W is mounted upon a spring-standard, which is secured to the draft-pole D near its rear end; and this standard is inclined backward over the axle C, so that the weight of the driver sitting upon the seat W will operate to relieve the horses from much of the weight of the pole and its platform.

It will be seen, from the above description, that, after the grass is cut, none of it is rolled upon or pressed down. This is effected by arranging both the wheels H' in front of the finger-bar, and employing the rods $i\ i$ and clearers $b^2\ b^2$; and, while this is the case, it will be seen that I am enabled to support the finger-bar between the leading-wheels H' and transporting and driving-wheels B.

The frame A is adjustable vertically independently of the draft-pole and platform, thereby allowing a person riding upon this platform to raise or depress the cutting apparatus at pleasure, whether the machine is in operation or at rest.

Rectilinear reciprocating motion is given to the sickle in a regular manner, and without causing the sickle to bind and work hard, by means of the angular lever T on one of the bars F, which lever is attached, by one of its arms, to the sickle-bar, by means of a swivel-block or slider, $p$, applied to a stud rising perpendicularly from said sickle-bar, which slider plays freely in an oblong slot, O, through said lever.

This lever T is pivoted to its bar F, so that the oblique rod $i$, running back from the point of shoe G' in front of it, will prevent cut grass from becoming entangled in the joint of this lever.

Having described my invention, what I claim as new, and desire to secure by Letters Patent, is—

1. The lead-wheels H' H', applied in front of finger-bar G upon the outer sides of shoes G' G' and adjustably connected to these shoes, in combination with a rising and falling frame, A, two driving-wheels, B B, and a hinged central draft-tongue and platform, D E, substantially as described.

2. The two lead-wheels and two dividing-shoes, constructed alike, and each adapted for working next the standing grass, when these parts are arranged in front of a finger-bar beyond the cutting width of the machine, and beyond the tracks of the transporting-wheels B B, substantially as described.

3. In a front-cutting central-draft mower, the deflecting rods $i\ i$, extending from the front ends of shoes G' G', which are arranged in front of the cutting apparatus to points which are within the space between the two wheels B B, substantially as described.

4. Scrapers or track-clearers, $b^2$, applied to flaring bars F F, in lines with the transporting-wheels B B, substantially as described.

5. The flat-sided swivel-block $p$, fitted on a pin of the sickle-bar H, and in an oblong slot, $o$, of the bell-crank or elbow-lever of a harvester-pitman, substantially in the manner shown and described.

6. The arrangement of the flaring frame A A F F, finger-beam G, sickle H, wheels H' H' and B B, axle C $c\ c$, tongue D, the driving-gearing, and the devices for raising and lowering the cutting apparatus and stopping and starting the same, the said parts all being constructed and operating as herein described.

7. The guards $r\ r$, constructed in the form herein described, and applied to the machine and in the relation to the gears $j\ j$, in the manner and for the purpose set forth.

JOHN D. WILBER.

Witnesses:
JOHN F. WINSLOW, Jr.,
FRANCIS K. STEVENS.